US006055000A

United States Patent [19]

Okada

[11] Patent Number: 6,055,000

[45] Date of Patent: Apr. 25, 2000

[54] STORAGE MEMORY FOR IMAGES

[75] Inventor: Satoshi Okada, Suita, Japan

[73] Assignee: SNK Corporation, Japan

[21] Appl. No.: 09/087,605

[22] Filed: May 28, 1998

[51] Int. Cl.[7] .................................................... G06F 13/00

[52] U.S. Cl. ......................... 345/508; 345/186; 345/202

[58] Field of Search ................................. 345/508, 188, 345/186, 510, 202, 501

[56] References Cited

U.S. PATENT DOCUMENTS

| | | | |
|---|---|---|---|
| 4,947,344 | 8/1990 | Hayashi et al. | 345/437 |
| 5,828,418 | 10/1998 | Lee | 348/556 |
| 5,867,167 | 2/1999 | Deering | 345/419 |
| 5,970,173 | 10/1999 | Lee et al. | 382/236 |
| 5,999,189 | 12/1999 | Kajiya et al. | 345/430 |

*Primary Examiner*—Kee M. Tung
*Attorney, Agent, or Firm*—Sheppard, Mullin, Richter & Hampton LLP

[57] ABSTRACT

An image storage memory apparatus comprises a first memory for separating an image of M by N pixels into a plurality of blocks, generating H pieces of sets making coded notation of the mutually different m by n kinds of colors into each set component, and memorizing H pieces of sets without a set of the above selected set component among the H pieces of sets in the other set component, a second index for having a first index identifying one of the above set, and identifying each set component of the set identified by the first index, a second memory for combining the first and second index into a second set, the second set comprising (M by N)/(m by n), an order of m by n pieces of the second set components equivalent to the second index of the second set comprising a set of (M+N)/(m+n) pieces of sets memorized corresponding to the order of pixels in a raster scanning in the block, and a controller for connecting to the first and second memories, identifying the coded notation of each color in each pixel of M by N pieces by data obtained from the both memories, and outputting an image data of M by N pieces of pixels by the predetermined color information by its coded notation. The block address Memory is consisted of a region storing the number of the palette package line and a region storing compression or non-compression of the data stored in the palette package Memory. The number of the palette package index is stored in the block address Memory, and thus to identify a top address of the palette Memory required for the reproduction of the intended image. The desired pixel color is supposed to be selected by the processor, that is, the random access can be made.

12 Claims, 6 Drawing Sheets

STORAGE MEMORY FOR IMAGES

BACKGROUND OF THE INVENTION

1. Field of the Invention

The present invention relates to an image storage memory that is capable of memorizing images effectively (i.e., compressively), and more particularly to an image storage memory that is lossless (i.e., reversible) by an application of quantization technology.

2. Background

As a lossless compressible technology for images, the Run-Length coding method is well known. An example of Run-Length coding as a compressible technology follows:

The example image is a binary image (i.e., a monochrome, black-and-white image), which comprises pixels of 30 rows as longitudinal by 30 columns as traverse.

When each pixel (dot) line of the first line is represented as code '0' to be white and as code '1' to be black, the line may be represented as '00000100000001000000100000001 (29 bits)'. In this case, five digits may be represented as code '0' in the beginning, and then one digit may be represented as code '1'. Subsequently, seven digits, one digit, six digits, one digit, seven digits, and one digit are represented as code '0', code '1', code '0', code '1', code '0', and code '1', respectively. Thus, this is a method for coding consecutive number and compressing an image by decreasing number's portion repeated by the same number.

However, the problem of the above prior art is that an intended image cannot be individually read and reproduced at every pixel (i.e., through random access). That is, the most important factor of this problem is that it varies according to the data and therefore it cannot be regularly memorized.

Unless such random access can be made, it takes a large time period to process specific pixel data from an image system such as, for example, a 3D computer graphic.

In the case where specific image data in texture space is rendered on a CRT by rotation and reduction, as shown in FIG. 10(B, C), it cannot reproduce this on the CRT in a raster order, as it is, because the CRT image data is scanned and memorized in a raster scanning order in the texture space.

This causes a requirement to represent a surface as a line in the texture space on CRT, and to be unable to reproduce the original figure as it was by reduction.

It requires a lot of time to scan the data in a raster scanning order in a texture space, and to fetch specific, randomly accessed information.

SUMMARY OF THE INVENTION

Accordingly, it is an object of the invention to provide an image storage memory to compress image data by the use of quantization technology for the above circumstances.

Other aspects, objects, and several advantages of the invention will become apparent to one skilled in the art from a reading of the following disclosure and the appended claims.

To achieve the above object, the present invention can be described to be as follows.

That is, the present invention comprises a first memory, a second index, a second memory and a controller. The first memory is for separating an image of M by N pixels into a plurality of blocks, generating H pieces of sets making the coded notation of the mutually different m by n kinds of colors into each set component, and memorizing in order not to include a set of the above selected set component among the H pieces of sets in the other set component. The second index is for having a first index identifying one of the above set, and identifying each set component of the set identified by the first index. The second memory is for combining the first and second index into a second set, the second set comprising pieces of (M by N)/(m by n), an order of m by n pieces of the second set components equivalent to the second index of the second set comprising a set of (M+N)/(m+n) pieces of sets memorized corresponding to the order of pixels in a raster scanning in the block. And, the controller is for connecting to the first and second memories, identifying the coded notation of each color in each pixel of M by N pieces by data obtained from the both memories, and outputting an image data of M by N pieces of pixels by the predetermined color information by its coded notation.

The variables M and N may be the same number, or they may be applied to intended images having a different number. The variables m and n may be different and/or the same number, as the can the above-mentioned M and N, and may not be restricted by their numbers.

An image storage memory for generating a large-scale display by means of a plurality of images has a third memory for memorizing a third set making numbers of the first index and the third index identifying compression or non-compression into the third set component, and for establishing and memorizing the number of images every image.

The third memory is so constructed to be connected to the controller, and to identify a top position of the first memory extracting the coded notation of the desired pixel color based on the data therein.

DETAILED DESCRIPTION OF THE PREFERRED EMBODIMENTS

Hereinafter, one embodiment of the image storage memory of the present invention, applying an image coding quantization technology, will be described.

Although this embodiment will be described by considering an M by N image, where M and N are each 32, and by considering the image to be divided into m by n sized blocks, where m and n are each 2, and although both are selected to be square for simplicity, the present invention is not be restricted thereto, and either may be in the form of a rectangle.

Figure 1:
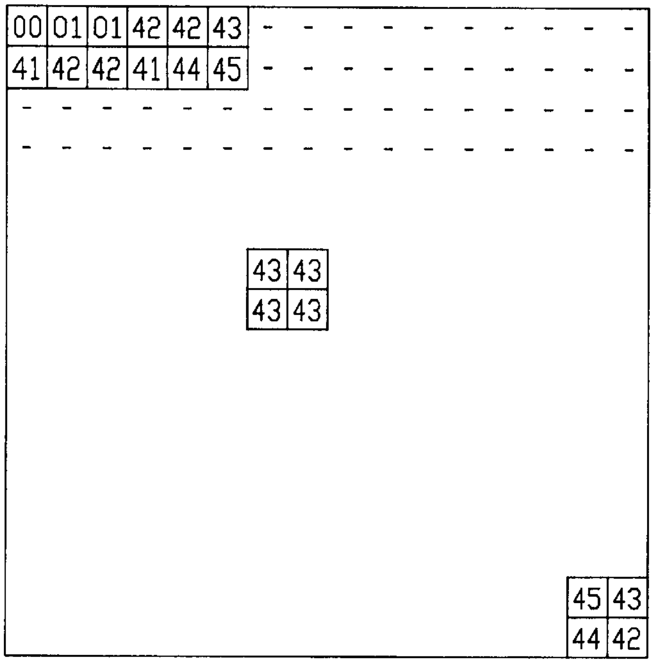
FIG. 1 is a view showing image data of 32 by 32 pieces of pixels used to describe an embodiment of the present invention.

An intended image, having 32 by 32 pieces of pixels, is shown in FIG. 1. It is divided into blocks comprising 2 by 2 pieces of pixels in a horizontal and a vertical direction. Each of the above pixels use a capacity of 8 bits, and each is available for representing images in 256 colors. For example, pixel (0,0) of the left and upper corner (1 line/1 column) represents one of the coded notation of 256 kinds of colors, represented by 8 bits.

Figure 2:
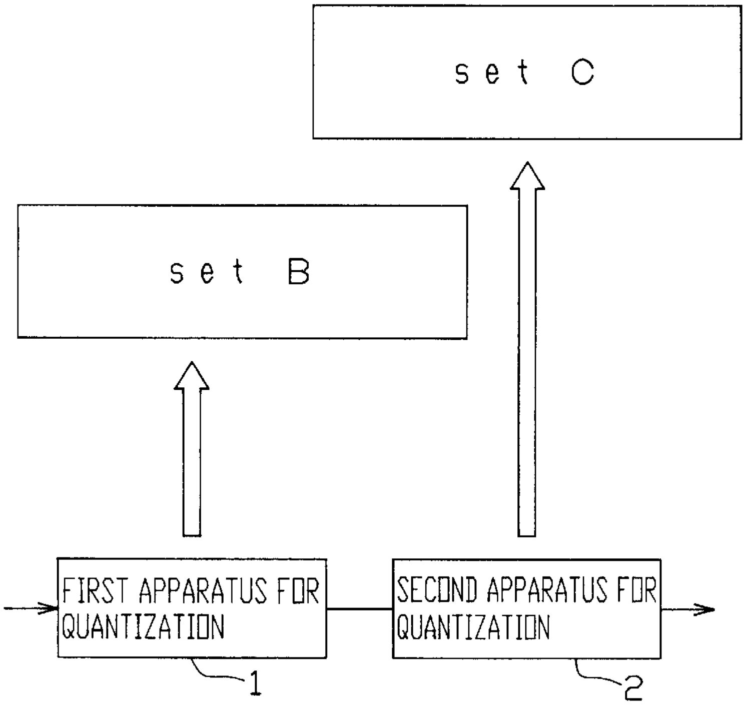
FIG. 2 is a block diagram depicting an explanatory view to describe an embodiment of the present invention.

Consider set A as a set of components of all pixel values among the above divided blocks. Left and upper block 1, set A1 (00,01,41,42), is input into a first and second apparatus for quantization 1, 2 in a raster scanning order every block (as shown in FIG. 2). Although the set components of set A1 are represented in a hexadecimal number, this is for convenience as applied to the description of this embodiment. The set components may be represented in decimal or binary numbers, and the present invention should not be restricted to any form of number.

Set A can be represented as sets B, C and D, as is described hereinafter.

Figure 3:
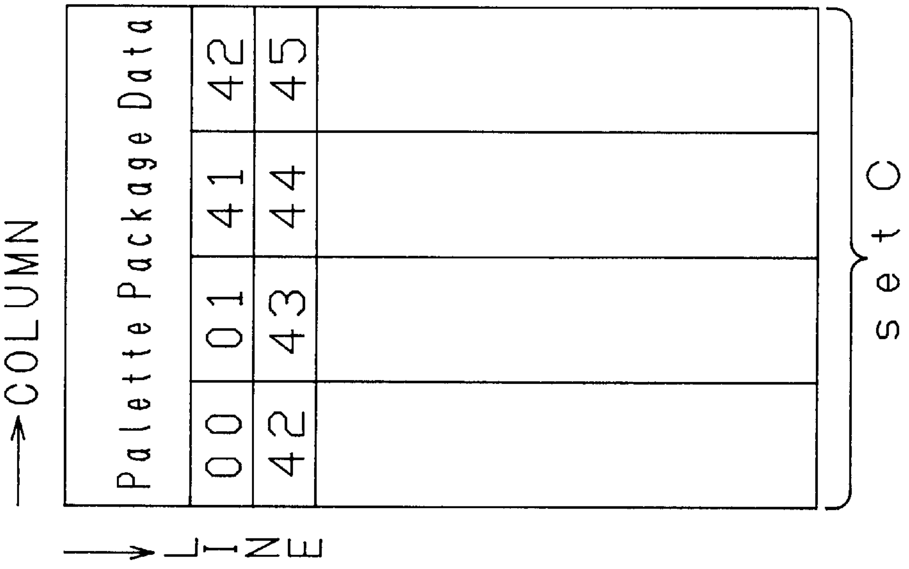
FIG. 3 is a table tabulating palette package data for the image data of FIG. 1.

FIG. 3 shows palette package data tabulating the above set C. The coded notation of colors used every block is assembled as set C, in a raster scanning order. The position, in the coded notation of colors, that is required for the expression of pixels corresponding to the raster scanning order within a block, is assembled as set B in the first apparatus for quantization.

Figure 4:
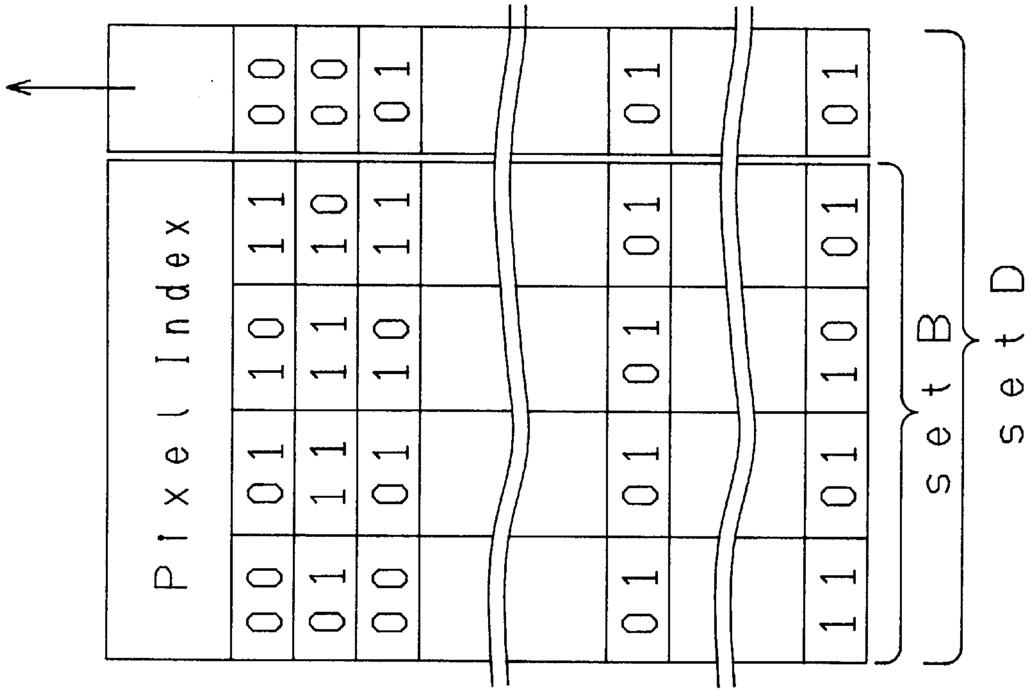
FIG. 4 is a table tabulating a pixel index for the image data of FIG. 1.

The pixel index, being the second index, tabulates the above set B, and is shown in FIG. 4. In each line of the table showing the pixel index, the palette index, being the first index, shows the corresponding relationship between the above line and the palette package data that tabulates the above set B. Set D combining the palette index and set B into a second set component, corresponds to the second set of the present invention.

Although palette index 00 (expression of line 0 by 8 bits) corresponds to the coded notation [00,01,41,42] of colors in the first line of FIG. 3 of the palette package data, it will be understood by such a relationship to be expressing the right and upper block 1 in FIG. 4 of the pixel index attached to the palette index 00 in FIG. 3 and FIG. 4 and its adjacent block 2 represented by colors of the coded notation [00,01,41,42] of the same kind of colors.

Figure 5:
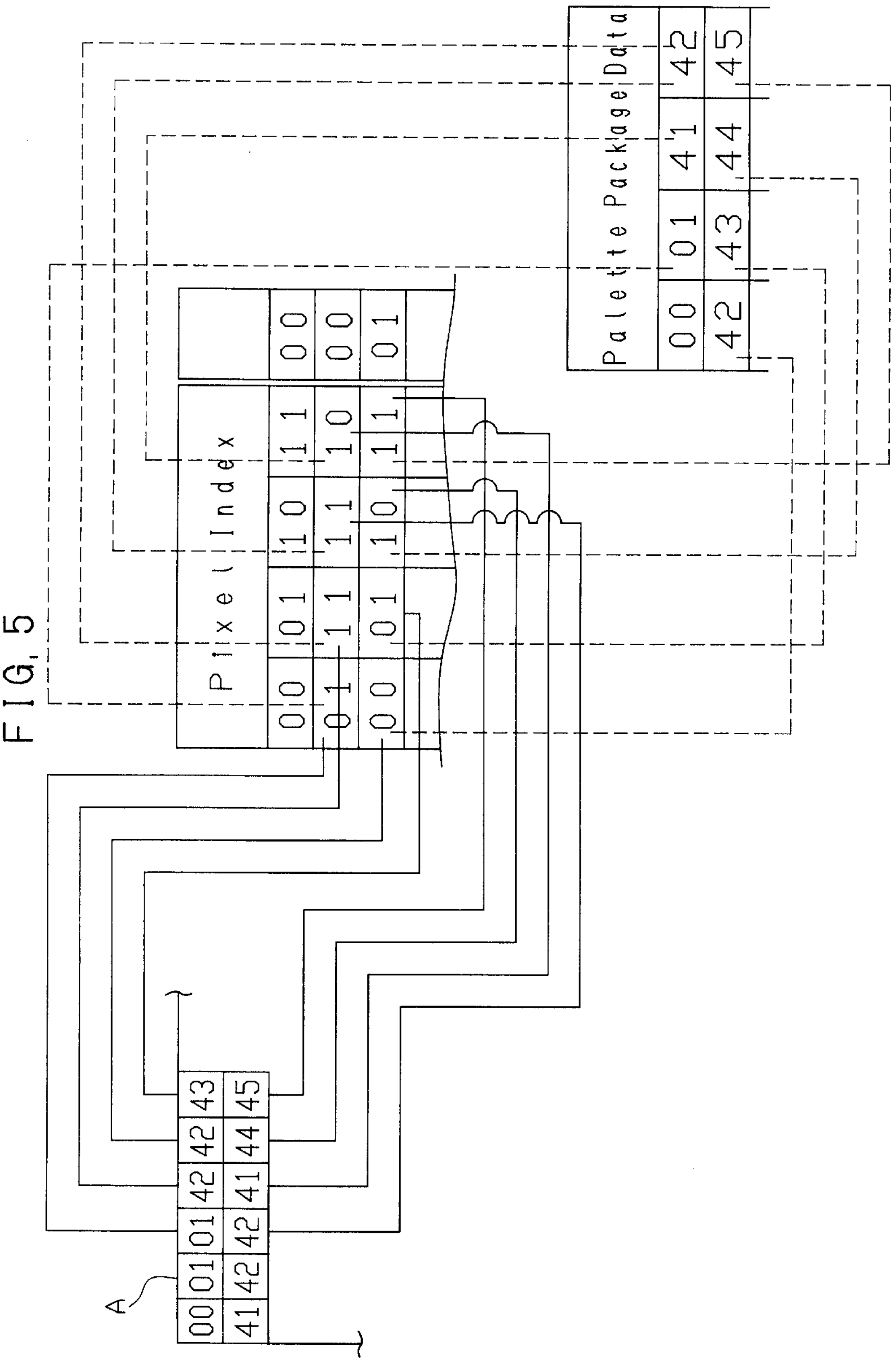
FIG. 5 is a view showing the correspondence between the palette package data and the pixel index.

Although the pixel index of the block 2 is, for example, represented by [00,11,11,10], the first [00], the second [11], the third [11], and fourth [10] corresponds to [00] in first column, [42] in fourth column, the same [42] as the second, and [41] in third column of the palette package data, respectively. The 2-bit binary data represented in each line of the pixel index, corresponds to the color of the coded notation of the column's color of the corresponding palette index. An illustration of the corresponding relationship is FIG. 5.

Furthermore, the pixel index lines exist corresponding to the number of the divided blocks. In the case of the present embodiment, the block consists of 16 by 16 pieces, that is, 256 lines in FIG. 4, representing 32 by 32 pieces of pixels in A, which are considered therein.

Next, the memory capacity for the above-described embodiment will be described.

The palette package data can be expressed in such a way that the color expression 8 bits multiplied by 4 palettes is equal to 32 bits, as it includes, at most, 4 palettes.

As only four colors can be, at most, be seen in a block, the block can be expressed by 4 (2 by 4 is equal to 8 bits) pieces of 2-bit pixel indexes, one index per each pixel. Therefore, the pixel Memory, being the second memory memorized in set B, and the palette index, are represented by 16 bits, the total of 8 bits pixel index and 8 bits palette index, per line in FIG. 4, and it requires 512 bites (being equal to 16 bits by 256 pieces), as a block has 256 (256 lines).

Next, as the palette package data has 4-color coded notations in a line of palette package data, the line has the capacity of 32 bits (equal to 8 bits by 4 bits). Thus, the total number of common palette package lines, multiplied by 32 bits, is required in total. Considering an original image as 100 percent, 65 to 70 percent in compressibility has been, in average, achieved in the inventor's experiments.

Figure 6:
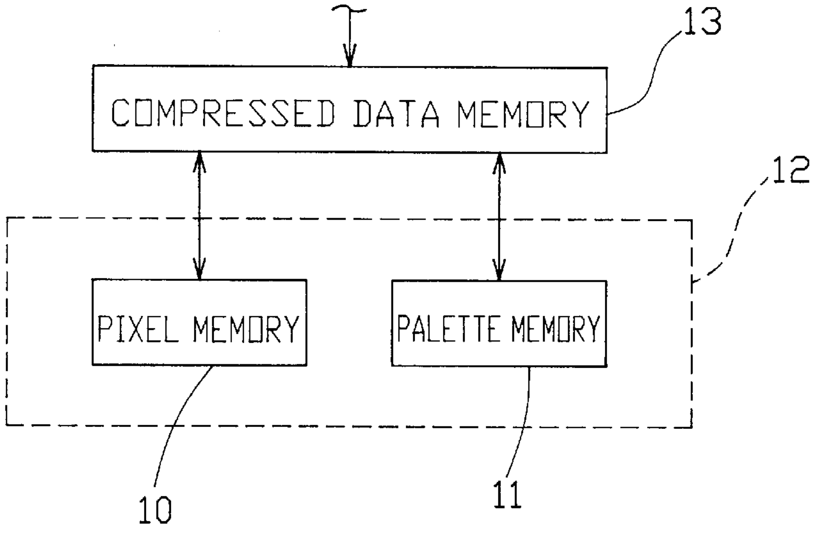
FIG. 6 is a block diagram of an embodiment of the present invention.
Figure 7:
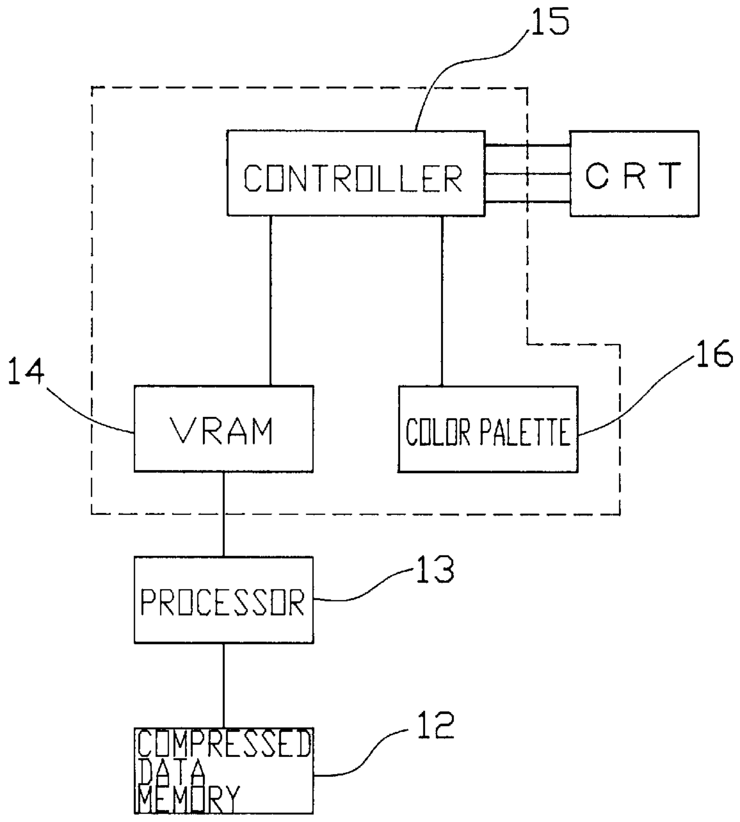
FIG. 7 is a block diagram of a system including the embodiment of FIG. 6.

Next, an operation will be described until the image data is displayed, for example, on CRT, as an image displaying means according to FIG. 6 and FIG. 7. As shown in FIG. 6, compressed data memory 12 is a general term for the above pixel Memory 10 and the palette Memory 11. The compressed data memory 12 may read a color address sequentially from the first line of the pixel index in FIG. 4 into the palette package data of the palette Memory by a processor 13, the palette Memory in sequence from the first line of pixel index in FIG. 4 by a processor 13, and may read the palette index memorized in the same line and identify the use of the palette package data. That is, the processor 13 in accordance with the palette index selects and distributes the palette package to display each line, and corresponds to the color coded notation in accordance with the color address.

The information of every block's color coded notation, obtained in such a way, may be sequentially stored in VRAM 14 by the processor. As every stage stores 256 lines, it may be reproduced in VRAM of FIG. 7, as being an original data.

A controller 15 in accordance with the data stored in the VRAM 14 gets the color information for each pixel's coded notation of colors from a color palette 16. This color information is output into an analogue converter, which is not shown in the figures. The analogue converter outputs an RGB video signal, according to the color information, to the CRT, which displays the image.

The processor 13 and the controller 15 correspond to a controller according to the present invention. As the data stored in the palette Memory is regularly arranged and stored, a visual image disposed in a specific place can be fetched by calculation. This is in contrast to compressive methods such as Run-Length coding, as mentioned above, with which it is impossible to reproduce only an image disposed in the desired place without the sequential reproduction of data, as there is no regularity in the color data. That is, it is unknown how many of the same color pixels will be sequentially continued and compressed.

Next, an example of a method for memorizing data into the pixel Memory and the palette Memory will be described.

In FIG. 1, the image may be scanned by raster scanning every block from the uppermost and leftmost block to the right block, and the palette package data of the palette Memory 11 may be fixed in the 4-arranged stage of coded notation of colors represented by hexadecimal method of [00] to [FF] and the block represented by the same colored coded notation adds the same palette index as the pixel Memory.

A group of blocks having [00] among the entire block of 32 by 32 pieces of the intended image are searched. If it exists, a group of blocks followed by the next signal [01] among the group of the existed blocks are searched.

First of all, a group of blocks having [00] among the entire block of 32 by 32 pieces of the intended image will be searched. If it exists, a group of blocks followed by the next signal [01] among the group of the existed block will be searched. If it exists as the same as the above, [10] will be searched. If it exists, [11] will be searched. The palette package data is fixed as an assembly (set) as tabulated in the first line of FIG. 3 with four signals arranged. All the same palette indexes will be affixed in their groups. The block (affixed the same palette index) as being represented by the same palette package data can be excluded from the next scanning.

In case that there is no code [00] in any blocks, the next code [01] will be searched. If there is no code [01], code [10] will be searched. In such a way, the palette package data of each line will be fixed. In case that four data as being set components of palette package data per line will be fixed in such a way, it becomes the coded notation of different colors. Although it is better when this fixed palette package data corresponds to the entire block, cases occur where it does not belong to any palette package data therein. In such a case, it might be that another palette package data can be made with the greatest common data of code of block color. If the number of blocks that do not belong to any block are few, they might be used as individual data.

Next, a modification of the above embodiment will be described in accordance with FIG. 8 and FIG. 9.

This modification is an image storage memory for having a plurality of 32 by 32 pieces of intended images as texture images, and is an image storage memory to reproduce a large-scaled image in accordance with these intended images. In the description of this modification, similar reference numerals are used to describe elements that are comparable to elements in the above embodiment.

Although a plurality of intended images are considered to be the same-scale texture image as the above-mentioned 32 by 32 pieces of intended image, a different-scale texture image can be used without being restricted to this-size texture image.

Figure 8:
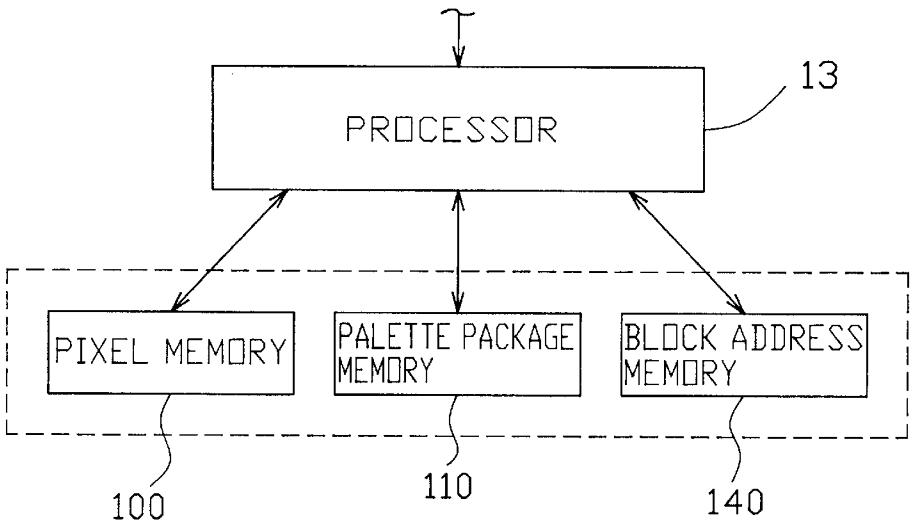
FIG. 8 is a block diagram of a second embodiment of the present invention.

In this embodiment, a block address Memory 140, as a third memory, is provided in addition to the pixel Memory 100 and the palette package Memory 110 as shown in FIG. 8.

In the pixel Memory 10 in the table as shown in FIG. 4, images equivalent to the intended image as representing a large-scale image in the pixel Memory 100 should be sequentially stored. The intended image is 32 by 32 pieces of pixel. Accordingly, in case that the line in the table of FIG. 4 is 256 lines per one intended image, for example, four intended images, the intended image will be 256 pieces by 4 lines. Thus, necessary capacity of memory is required for 512 bites multiplied by 4 lines.

Figure 9:
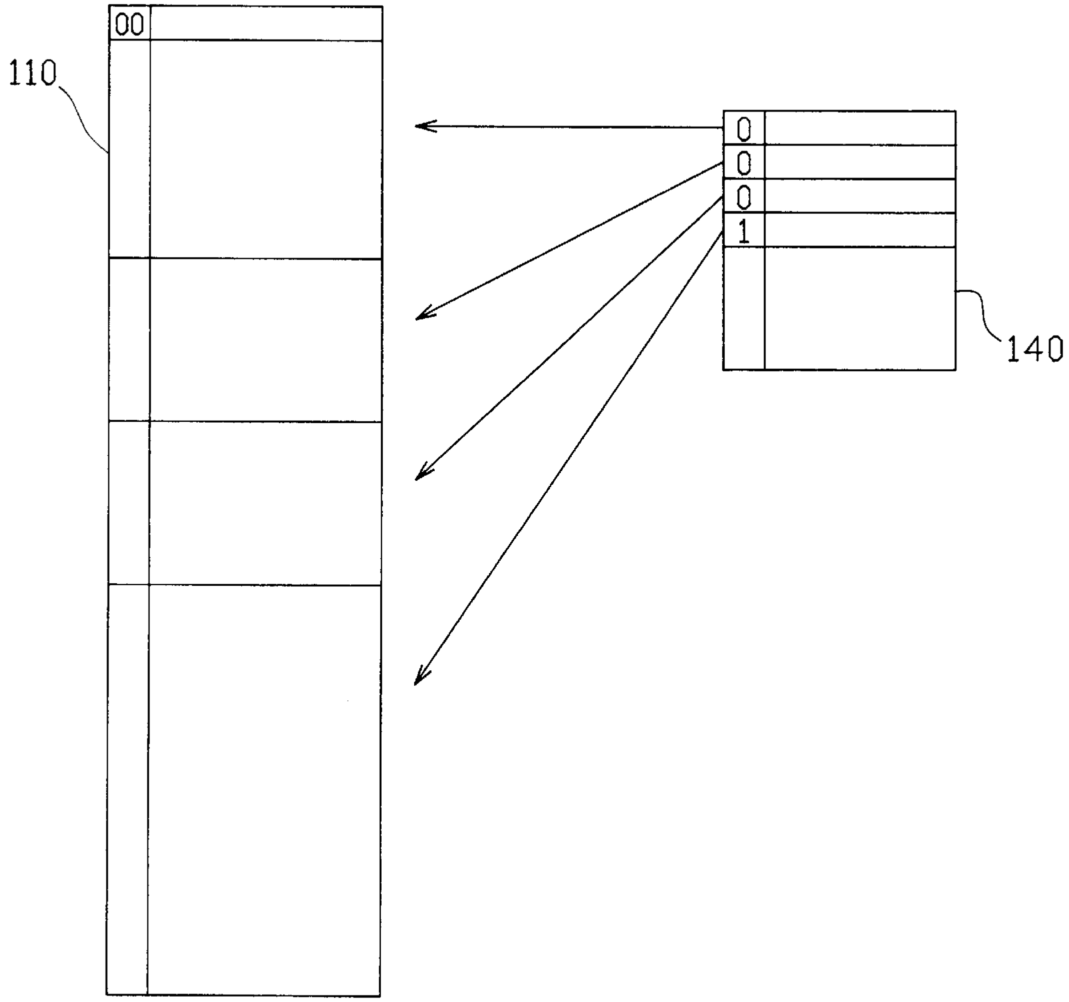
FIG. 9 is a view showing the correspondence between a palette package Memory and a block Memory of the second embodiment of the present invention.
Figure 10:
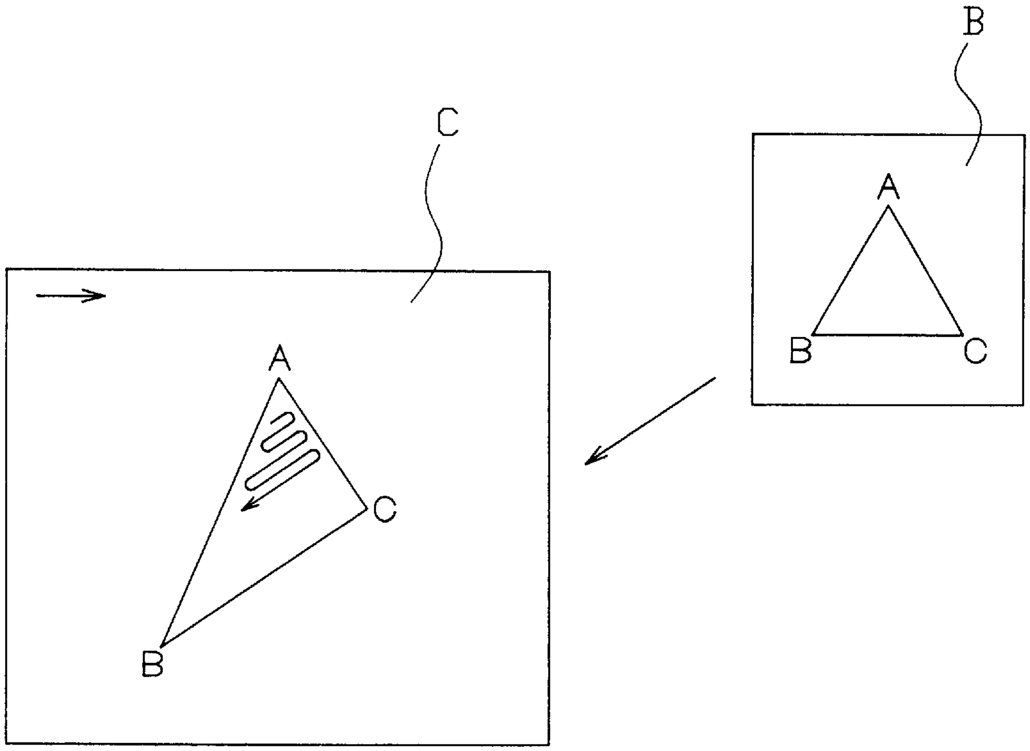
FIG. 10 is an illustrative view of a transformed image.

Next, the palette package Memory 110 is stored every intended image as shown in FIG. 9 as well as the pixel Memory 10. As the palette index is processed in the capacity of 8 bits in this embodiment, the palette package data to each intended image as shown in FIG. 9 is constructed to be separated and stored. 8, 16, and 32 bits are generally used as Memory. When some of the intended images of 32 by 32 pieces of pixels are used in this embodiment, it is possible to store as a lump-sum table as not stored separately in a further compressed state by using 16-bit capacity into the palette index. In view of efficient and economical storing, 8 bits (as being cheap as memory) is allocated in the palette index of this embodiment.

Thus, in case that the palette package data is separated and stored every intended image, the number of the palette package data will be ‘a’, ‘b’, ‘c’, and ‘d’ according to the difference of the compressibility at each image as shown in FIG. 9, that is, the data quantity differs from their compressibility. In this way, it is difficult to make random access as well as the conventional Run-Length coding as above mentioned, in case that the number of the palette package data differs every each intended image.

Therefore, this embodiment is provided with a block address Memory 140 as shown in FIG. 8 and FIG. 9, thus to overcome this problem.

The block address Memory 140 consists of a region storing the number of the palette package line (number of the first set component of the present invention) of the corresponding intended image and a region storing compression [0] or non-compression [1] of the data stored in the palette package Memory. The number of the palette package index is stored as data in the block address Memory 140. Thus, it is possible to identify a reading top address of the palette Memory required for the reproduction of the intended image by the processor 13 as a controller. If the top address can be identified, the code of the desired pixel color can be selected by the processor 13 according to the data of the pixel Memory 100 and the palette package Memory 110 as described in a conventional embodiment. Although the data of the pixel Memory 10 is consecutively stored concerning the data of the pixel Memory 100, the data of each pixel Memory 10 cannot be compressed. Thus, the number of the set D becomes regular and the block address Memory 140 as above mentioned is not required.

In FIG. 9, the number of the palette package index of the intended image 1, the intended image 2, the intended image 3, and intended image 4 is stored in ‘a’, ‘b’, ‘c’, and ‘d’, respectively. The fact that the intended images 1 to 3 are compressible data and the intended image 4 is non-compressible, is stored as data in the block address Memory 140.

The flag of compression or non-compression is used for separating and possessing the coded notation of the color of the intended image ‘d’ in two Memories, that is, a pixel Memory 100 and a palette package Memory 110 in case of non-compression. The way of reading depends upon when it is compressibly or non-compressibly stored in the palette package Memory. The flag is accordingly required for switching the way of reading by the processor 13 in this embodiment.

Although the color display image has been described by giving an example in the above two embodiments, it is not restricted to the image storage memory using such a color palette 16, and may be also applied to a monochrome image when it is constructed to memorize the coded notation of colors as coding the brightness information of the palette Memory 11, 110, as a first memory.

Thus, the image storage memory according to the present invention comprises a first memory, a second index, a second memory and a controller. The first memory is for separating an image of M by N pixels into a plurality of blocks, generating H pieces of sets making the coded notation of the mutually different m by n kinds of colors into each set component, and memorizing in order not to include a set of the above selected set component among the H pieces of sets in the other set component. The second index for having a first index identifying one of the above set, and identifying each set component of the set identified by the first index. The second memory is for combining the first and second index into a second set, the second set comprising pieces of (M by N)/(m by n), an order of m by n pieces of the second set components equivalent to the second index of the second set comprising a set of (M+N)/(m+n) pieces of sets memorized corresponding to the order of pixels in a raster scanning in the block. And the controller is for connecting to the first and second memories, identifyig the coded notation of each color in each pixel of M by N pieces by data obtained from the both memories, outputting an image data of M by N pieces of pixels by the predetermined color information by its coded notation.

Therefore, the image information can be output by means of randomly accessing any pixel by the controller.

As the selected set of the set component is stored in order not to include the set of the other set components in the first memory, it is possible to store the image data effectively without overlapping the information stored in the first memory. The larger ((M by N)/(m by n)–H) is, the larger the compressibility will be.

Furthermore, in case where a large-scale display is generated by a plurality of images (texture images) in claim 2, the image storage memory includes the third memory, which is connected to the controller. The third memory establishes the number equivalent to the image number every image, and memorizes the third index, making the number of the second set component equivalent to the second index, and making the third index identify the compression or non-compression into the third set component. Accordingly, the random access can be made, even when a plurality of images are composed.

Furthermore, an image storage memory is equipped with a game machine. For example, this kind of game machine is supposed to run a computer program for games and display an image data. Then, the above image storage memory is used to memorize the image data.

Furthermore, in the case where an apparatus such as a game machine for home use, or a portable game machine, has a small memory capacity, an image storage memory, as mentioned above in this embodiment, will be more effective in using the memory capacity.

Although only one embodiment of the present invention has been disclosed and described, it is apparent that other embodiments and modifications of the invention are possible.

What is claimed is:

1. A storage memory for images comprises:

a first memory for separating an image of M by N pixels into a plurality of blocks, generating H pieces of sets making coded notation of the mutually different m by n kinds of colors into each set component, and memorizing the H pieces of sets, a second index for having a first index identifying one of the above set, and identifying each set component of the set identified by the first index, a second memory for combining the first and second index into a second set, the second set comprising (M by N)/(m by n), an order of m by n pieces of the second set components equivalent to the second index of the second set comprising a set of (M+N)/(m+n) pieces of sets memorized corresponding to the order of pixels in a raster scanning in the block, and a controller for connecting to the first and second memories, identifying the coded notation of each color in each pixel of M by N pieces by data obtained from the both memories, outputting an image data of M by N pieces of pixels by the predetermined color information by its coded notation.

2. The first memory according to claim 1, is characterized by memorizing without a set of the above voluntary set component among the H pieces of sets in the other set component.

3. In a storage memory for images according to claim 1, for generating a large-scale display by means of the images, wherein the storage memory for images has a third memory for memorizing a third set making the number of the third set component equivalent to a third index and the third index identifying compression or non-compression into the third set component, the third set component, the third memory is connected to the controller, and the controller is constructed to identify a top position of the first memory extracting a coded notation of the desired pixel color in accordance with the data of the third memory.

4. A storage memory for images according to claim 3, is characterized by having a third memory for establishing number equivalent to the image number every image.

5. For use with an apparatus for games having means for generating an image, means for displaying the image, and a storage memory for the image data, the storage memory for images is characterized by comprising:

a first memory for separating an image of M by N pixels into a plurality of blocks, generating H pieces of sets making coded notation of the mutually different m by n kinds of colors into each set component, and memorizing the H pieces of sets, a second index for having a first index identifying one of the above set, and identifying each set component of the set identified by the first index, a second memory for combining the first and second indexes into a second set, the second set comprising pieces of (M by N) divided by (m by n), an order of m by n pieces of the second set components equivalent to the second index of the second set comprising a set of (M+N)/(m+n) pieces of sets memorized corresponding to the order of pixels in a raster scanning in the block, and a controller for connecting to the first and second memories, identifying the coded notation of each color in each pixel of M by N pieces by data obtained from the both memories, outputting the image information of M by N pieces of pixels by the predetermined color information by its coded notation.

6. An apparatus for games according to claim 5 is a game machine for commercial use.

7. An apparatus for games according to claim 5 is a game machine for home use.

8. An apparatus for games according to claim 5 is a handy game machine.

9. An image storage memory apparatus comprising:

a first memory device configured for separating an image of M by N pixels into a plurality of blocks, each block having m by n pixels, configured for generating a palette set including a plurality of palette subsets, each palette subset including a plurality of components that each include a coded notation of a pixel color, and configured for memorizing the palette set;

a second memory device configured for generating an index set including a plurality of index subsets that correspond to the plurality of blocks, respectively, wherein, for each index subset, the index subset includes a first index identifying one palette subset, the index subset includes a second index having m * n components that correspond to the m by n pixels in the corresponding block, respectively, and each component of the second index identifies a component in the identified palette subset, the identified palette subset component indicating the corresponding pixel's color; and a controller connected to the first and second memory devices, the controller being configured to identify each pixel's color from the first and second memory devices, and configured to output the image.

10. The image storage memory apparatus of claim 9, wherein the number of components in each palette subset equals the number of pixels in each block.

11. The image storage memory apparatus of claim 9, wherein, for each palette subset, each component contains a mutually different pixel color from each other component.

12. The image storage memory apparatus of claim 9, wherein the number of components in each palette subset equals the number of pixels in each block, and wherein, for each palette subset, each component contains a mutually different pixel color from each other component.

* * * * *